US012737485B2

(12) United States Patent
Yanagisawa

(10) Patent No.: US 12,737,485 B2
(45) Date of Patent: Sep. 15, 2026

(54) DOCUMENT SHARE MANAGEMENT BASED ON A RELIABILITY LEVEL OF A REQUESTER

(71) Applicant: Kyndryl, Inc., New York, NY (US)

(72) Inventor: Takashi Yanagisawa, Setagaya-ku (JP)

(73) Assignee: Kyndryl, Inc., New York, NY (US)

( * ) Notice: Subject to any disclaimer, the term of this patent is extended or adjusted under 35 U.S.C. 154(b) by 6 days.

(21) Appl. No.: 18/918,145

(22) Filed: Oct. 17, 2024

(65) Prior Publication Data

US 2026/0111578 A1 Apr. 23, 2026

(51) Int. Cl.
*G06F 21/62* (2013.01)
*G06F 16/93* (2019.01)

(52) U.S. Cl.
CPC .......... *G06F 21/6209* (2013.01); *G06F 16/93* (2019.01)

(58) Field of Classification Search
None
See application file for complete search history.

(56) References Cited

U.S. PATENT DOCUMENTS 7,779,002 B1 * 8/2010 Gomes .................. G06F 16/338 707/693
11,790,104 B2 * 10/2023 Gentilcore .......... G06F 16/9535 726/27
2007/0073625 A1 3/2007 Shelton
2016/0117770 A1 4/2016 Graham
2017/0139891 A1 5/2017 Ah-Soon et al.
2018/0248886 A1 8/2018 Hind
2020/0364363 A1 11/2020 Vanover
2021/0397522 A1 12/2021 Owen et al.
2023/0054446 A1 2/2023 Lafever et al.

* cited by examiner

*Primary Examiner* — Jeffrey C Pwu
*Assistant Examiner* — Mayasa A. Shaawat
(74) *Attorney, Agent, or Firm* — CANTOR COLBURN LLP; Erik Swanson

(57) ABSTRACT

A method for managing document sharing includes accepting, using at least one processor, a search request through a search query input to a client device by a user, acquiring, using the at least one processor, for parts of a document stored in a document database, a relevance degree of the parts and the search query. An aspect includes determining, based on the relevance degree, the parts of the document that are shared part candidates, in which at least one of the shared part candidates is a target shared part. An aspect includes splitting, using the at least one processor, the target shared part from the document and saving the target shared part in a non-volatile memory area. An aspect includes administering, using the at least one processor, an access right to the target shared part to the user.

20 Claims, 4 Drawing Sheets

START

Determine display information of search result from risk level and reliability level

S30

Transmit data for display of search result

S31

END

DOCUMENT SHARE MANAGEMENT BASED ON A RELIABILITY LEVEL OF A REQUESTER

BACKGROUND

The present invention generally relates to computer systems, and more specifically, to computer-implemented methods, computer systems, and computer program products configured and arranged for sharing documents.

Various systems for securely sharing documents have been proposed. U.S. Patent Application Publication No. 2021/0397522 describes a system including a backup infrastructure for preventing loss and tampering of documents.

To prevent the disclosure of confidential information when the documents are shared, document management systems often administer rights granted to users for accessing documents. For example, in an organization, the documents that a user is allowed to access are determined in accordance with the division or project group to which the user belongs.

Access rights are administered to the document as whole. Thus, if the user has no access right to the document, the user will not be able to access any part of the entire document even when the user wishes to access a non-confidential part of the document. Further, divisions and project groups change dynamically. Accordingly, access rights also have to be changed dynamically. However, the process for changing access rights is complicated and difficult to perform in a timely manner. Accordingly, the information contained in a document may not be shared as desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more embodiments, a method for managing document sharing includes accepting, using at least one processor, a search request through a search query input to a client device by a user. The method includes acquiring, using the at least one processor, for parts of a document stored in a document database, a relevance degree of the parts and the search query. The method includes determining, based on the relevance degree, the parts of the document that are shared part candidates, in which at least one of the shared part candidates is a target shared part. The method includes splitting, using the at least one processor, the target shared part from the document and saving the target shared part in a non-volatile memory area and administering, using the at least one processor, an access right to the target shared part granted to the user. As technical effects and technical advantages, searches and access administration are performed in units/divisions of document parts. This allows the information contained in documents to be shared securely and efficiently.

In addition to one or more features described above or below, or as an alternative, further embodiments disclose that the method may include calculating, using the at least one processor, a risk level indicating a confidentiality degree of the shared part candidates based on an analysis of information contained in the shared part candidates. As technical effects and technical advantages, the confidentiality degree of the shared part candidates is quantified. This allows the confidentiality degree of the shared part candidates to be reflected in the management of shared documents.

In addition to one or more features described above or below, or as an alternative, further embodiments disclose that the method may include calculating, using the at least one processor, a reliability level indicating how reliable the user is from the perspective of an administrator of the document including the shared part candidates by referring to log data of communication, performed with a communication tool, between the user and the administrator. As technical effects and technical advantages, the degree of how reliable the user is from the perspective of the administrator is quantified. This allows the degree of how reliable the user is from the perspective of the administrator to be reflected in the management of shared documents.

In addition to one or more features described above or below, or as an alternative, further embodiments disclose that the calculating the reliability level may include acquiring a based on the log data and using at least the frequency of communication to calculate the reliability level. As technical effects and technical advantages, the method allows the reliability level to be calculated in an accurate manner.

In addition to one or more features described above or below, or as an alternative, further embodiments disclose that the calculating the reliability level may include acquiring a time of communication between the user and the administrator based on the log data and using at least the time of communication to calculate the reliability level. As technical effects and technical advantages, the method allows the reliability level to be calculated in an accurate manner.

In addition to one or more features described above or below, or as an alternative, further embodiments disclose that the calculating the reliability level may include inferring a mood of at least one of the user and the administrator during communication between the user and the administrator based on the log data, and using at least data indicating the inferred mood to calculate the reliability level. As technical effects and technical advantages, the method increases the calculation accuracy of the reliability level.

In addition to one or more features described above or below, or as an alternative, further embodiments disclose that the method may include determining, using the at least one processor, information related to the shared part candidates that is to be included in a display of a search result in response to the search request based on the risk level and the reliability level, and generating data for displaying the search result. As technical effects and technical advantages, the information included in the display of a search result is determined by taking into consideration the relationship between the user and the administrator in addition to the contents of the shared part candidates. This allows the information of the search result to be disclosed securely.

In addition to one or more features described above or below, or as an alternative, further embodiments disclose that the generating the data for displaying the search result may include generating the data for displaying the search result by containing more information related to the shared part candidates in the display of the search result when the reliability level is greater than the risk level than when the reliability level is less than the risk level. As technical effects and technical advantages, the confidentiality degree of the shared part candidates and the degree of how reliable the user is from the perspective of the administrator are evaluated in a quantified manner so that more information is disclosed when the reliability degree is greater than the confidentiality degree. This allows information to be disclosed in a further secure manner.

In addition to one or more features described above or below, or as an alternative, further embodiments disclose that the generating the data for displaying the search result may include generating the data for displaying the search result without containing information related to the shared part candidates in the display of the search result when the reliability level is a minimum value. As technical effects and technical advantages, when the reliability of the user from the perspective of the administrator is extremely low, information related to the shared part candidates is not disclosed. This prevents information from being disclosed.

In addition to one or more features described above or below, or as an alternative, further embodiments disclose that the generating the data for displaying the search result may include generating the data for displaying the search result without containing information related to the shared part candidates in the display of the search result when the risk level is a maximum value. As technical effects and technical advantages, when the confidentiality degree of the shared part candidates is high (as predefined), information related to the shared part candidates is not disclosed. This prevents information from being disclosed.

In addition to one or more features described above or below, or as an alternative, further embodiments disclose that the method may also include calculating, using the at least one processor, a risk level of the shared part candidates and a reliability level, and the administering the access right to the target shared part granted to the user includes determining a range of authority for the access right granted to the user based on the risk level and the reliability level. As technical effects and technical advantages, the access right to the target shared part granted to the user is administered by taking into consideration the relationship between the user and the administrator in addition to the contents of the target shared part. This allows information to be disclosed in a secure manner.

In addition to one or more features described above or below, or as an alternative, further embodiments disclose that the determining the range of authority for the access right granted to the user may include giving more authority when the reliability level is greater than the risk level than when the reliability level is less than the risk level. As technical effects and technical advantages, the confidentiality degree of the shared part candidates and the degree of how reliable the user is from the perspective of the administrator are evaluated in a quantified manner so that higher access freedom is allowed when the reliability degree is greater than the confidentiality degree. This allows information to be disclosed in a further secure manner.

In addition to one or more features described above or below, or as an alternative, further embodiments disclose that the administering the access right to the target shared part granted to the user may include rejecting the user of access to the target shared part when the reliability level is a minimum value. As technical effects and technical advantages, when the reliability of the user from the perspective of the administrator is low (as predefined), the user cannot access the shared part candidate. This prevents information from being disclosed.

In addition to one or more features described above or below, or as an alternative, further embodiments disclose that the administering the access right to the target shared part granted to the user may include rejecting the user of access to the target shared part when the risk level is a maximum value. As technical effects and technical advantages, when the confidentiality degree of the target shared part is high as predetermined in advance, the user cannot access the target shared part. This prevents information from being disclosed.

In addition to one or more features described above or below, or as an alternative, further embodiments disclose that the method may include outputting, using the at least one processor, to the client device a shared link to the target shared part that is in accordance with the range of authority determined for the access right. As technical effects and technical advantages, the method ensures that the access right is granted to the user in accordance with the determination.

In addition to one or more features described above or below, or as an alternative, further embodiments disclose that the target shared part is one of the shared part candidates that is designated by the user. As technical effects and technical advantages, the processing load on the processor for saving the split data and setting the access right is less than when the shared part candidates are all target shared parts.

The present disclosure may be embodied in a computer system. Additionally, the present disclosure may be embodied in a computer program product that can be used by a computer or any programmable data processing device.

In this specification, "at least one of A and B" should be understood to mean "only A, only B, or both A and B."

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art.

Sequences of operations are exemplary and may be changed as apparent to one of ordinary skill in the art, except for operations necessarily occurring in a certain order. Descriptions of functions and constructions that are well known to one of ordinary skill in the art may be omitted.

Exemplary embodiments may have different forms and are not limited to the examples described. However, the examples described are thorough and complete, and convey the full scope of the disclosure to one of ordinary skill in the art.

In this specification, "at least one of A and B" should be understood to mean "only A, only B, or both A and B."

One aspect of the present disclosure includes acquiring, for parts of a document stored in a document database, a relevance degree of the parts and a search query, and determining, based on the relevance degree, the parts of the document that are shared part candidates, in which at least one of the shared part candidates is a target shared part. The aspect also includes extracting/splitting the target shared part from the document and saving the target shared part in a non-volatile memory area. Further, the method includes administering an access right to the target shared part granted to a user.

A further aspect includes calculating a reliability level indicating how reliable the user, who requests the document to be shared, is to an administrator of the document, and determining, based on the reliability level, the information that is to be included in a search result and a range of authority for the access right granted to the user.

Example configuration of a document share system is provided. According to one or more embodiments, the document share system will now be described with reference to the drawings.

Figure 1:
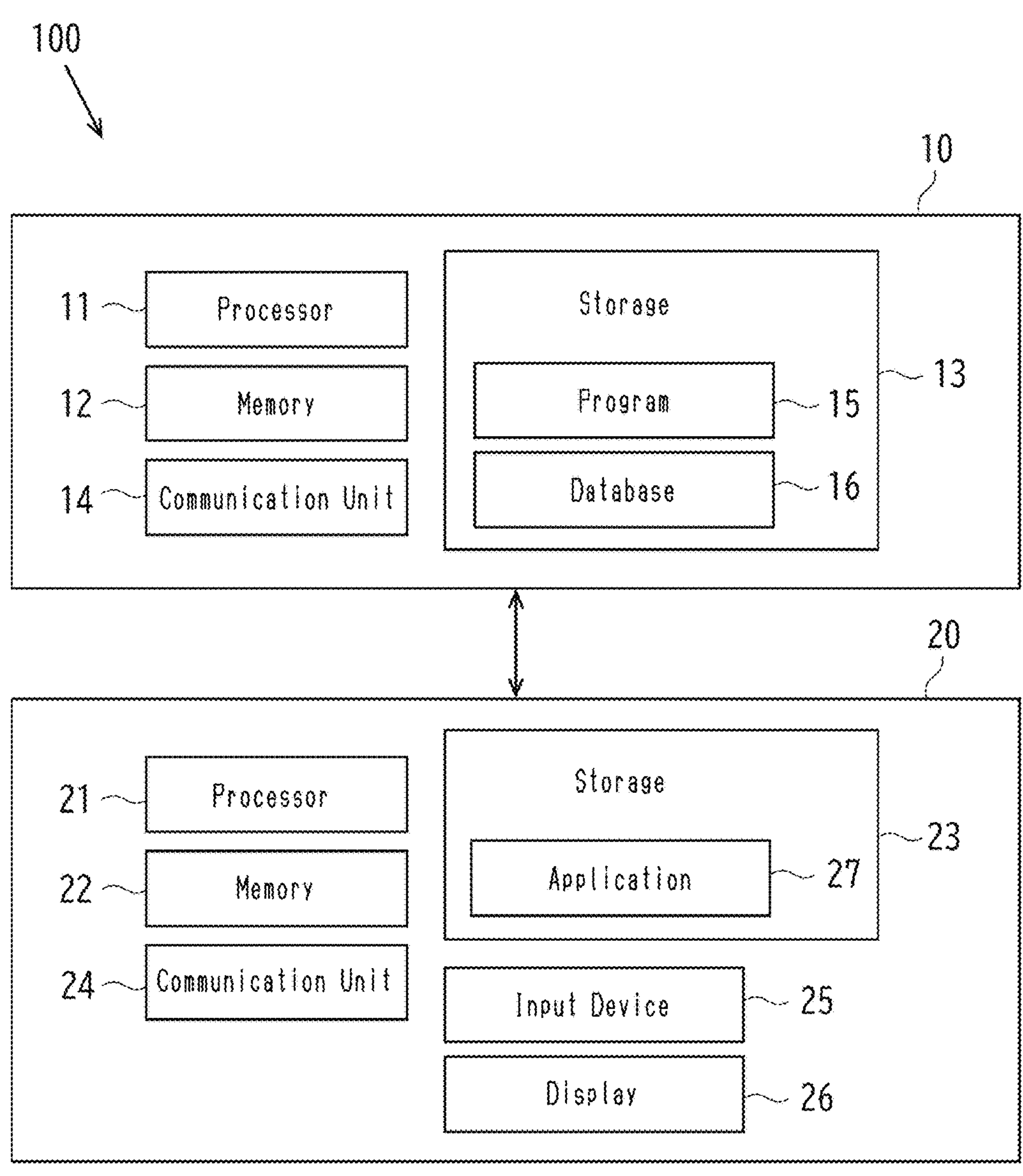
FIG. 1 is a schematic block diagram illustrating the configuration a document share system according to one or more embodiments.

As shown in FIG. 1, a document share system 100 in accordance with one embodiment includes a share management system 10 and at least one client device 20.

The share management system 10 is a system including one or more computers. The share management system 10 may be, for example, a personal computer, a server, such as a file server, a database server, or a mail server, or a combination of a personal computer and a server.

The share management system 10 manages the sharing of documents possessed/stored by an organization. The organization is a body organized for a specific purpose. The organization may be, for example, any type of body such as a business institution or a governmental institution. The organization may engage in profit-making activities or non-profit activities. The organization may be a body related to economics, administration, education, academy, sports, culture, health, welfare, the environment, etc.

The documents possessed by the organization may be electronic documents including text data. The documents may include image data. The documents may be, for example, written proposals, documented designs, documented instructions, documented procedures for providing services, project management documentation, and the like. The documents may be generated with word-processing software, presentation software, or spreadsheet software. Further, the document may be an online document generated with a collaboration tool functionality. The file format of the documents is not meant to be limited.

A single document includes multiple parts. A single part of a document is, for example, a single page, a single slide, a single sheet, etc. Further, a single part may be any segment of a document.

In another example, when the document is a document file, parts may be in units/divisions of chapters or sections that are included in a table of contents or the like. An online document may be divided into multiple parts based on the attributes of reference letters or specific keywords. Specific keywords can be, for examples, phrases used to indicate the transitioning of sentences such as "with regard to."

In this manner, the positions where document parts are divided may be varied in accordance with the specification and characteristics of the subject documents.

The client device 20 is operated by a user who requests a document to be shared. The user is a member of the organization. The client device 20 may be, for example, a personal computer, a tablet device, a smartphone, or the like.

The share management system 10 and the client device 20 are connected through a network. The network may be a local area network, a wide area network, any other type of network, or a combination of such networks. Further, the network may be a wireless network, a wired network, or a combination of such networks.

The hardware configuration of the share management system 10 and the client device 20 will now be described.

The share management system 10 includes at least one processor 11, at least one memory 12, at least one storage 13, and at least one communication unit 14. For the sake of convenience, in the example described hereafter, the share management system 10 includes a single processor 11, a single memory 12, a single storage 13, and a single communication unit 14.

The storage 13 stores a program 15 and a database 16. The program 15 and the database 16 may be at least partially stored in the memory 12.

The processor 11 executes the program 15, which is stored in the memory 12. The program 15 is configured to allow the share management system 10 to implement functionalities according to one or more embodiments. The functionalities include a share candidate determination functionality, a reliability calculation functionality, a search result generation functionality, and an access right administering functionality. The program 15 may include program modules executed by the processor 11 to run processes corresponding to the functionalities.

The communication unit 14 allows the share management system 10 to communicate with other devices including the client device 20 through the network.

The client device 20 includes at least one processor 21, at least one memory 22, at least one storage 23, at least one communication unit 24, at least one input device 25, and at least one display 26. For the sake of convenience, in the example described hereafter, the client device 20 includes a single processor 21, a single memory 22, a single storage 23, a single communication unit 24, a single input device 25, and a single display 26.

The storage 23 stores an application 27. The application 27 may be at least partially stored in the memory 22. The application 27 includes a program and data that cause the client device 20 to implement the functionalities of the share management system 10. The functionalities of the application 27 include a functionality for requesting the share management system 10 to search for and share a document and a functionality for displaying a response from the share management system 10. The processor 21 executes the application 27 to run processes corresponding to the functionalities.

The communication unit 24 allows the client device 20 to communicate with other devices including the share management system 10 through the network.

The input device 25, when operated by a user, outputs a signal, which corresponds to the operation, to the processor 11. The input device 25 may be, for example, a keyboard, a mouse, a touch panel, or the like. Based on signals and data from the processor 11, the display 26 displays information through text, images, and the like. The display 26 may be, for example, a panel, monitor, or the like that is based on liquid crystal or organic electroluminescence.

Each of the processors 11 and 21 may include, but is not limited to, a central processing unit (CPU), a graphics processing unit (GPU), an accelerated processing unit (APU), a neural network processing unit (NPU), a microprocessor, a microcontroller, a digital signal processor (DSP), a field programmable gate array (FPGA), a complex programmable logic device (CPLD), an application-specific integrated circuit (ASIC), a processor such as a versatile processor, or any combination of such devices designed to implement the functionalities described herein.

Each of the memories 12 and 22 and the storages 13 and 23 is a computer-readable storage medium and includes a non-transitory computer readable medium. The computer-readable storage medium is a physical device that holds or stores instructions used by the processor. The computer-readable storage medium may include, but is not limited to, for example, an electronic storage device, a magnetic storage device, an optical storage device, an electromagnetic storage device, a semiconductor storage device, or any combination of such devices. A computer readable storage medium, as referred to herein, is not to be construed as being a transitory signal, such as an electrical signal transmitted through, for example, radio waves or other freely propagating electromagnetic waves, electromagnetic waves propagating through a waveguide or other transmission bodies, or through a wire.

Each of the memories 12 and 22 includes a random-access memory (RAM). Each of the memories 12 and 22 may include a volatile or non-volatile computer readable storage medium that functions as a main memory or a cache memory.

Each of the storages 13 and 23 includes a non-volatile computer-readable medium. Each of the storages 13 and 23 may include, but is not limited to, for example, a read only memory (ROM), a solid-state drive (SSD), a hard disk drive (HDD), a flash memory, a memory card, an optical medium, a magneto-optical medium, a removable medium, a CD-ROM, or a combination of these devices.

The communications units 14 and 24 may include, for example, a TCP/IP adapter card, a wireless LAN interface card or antenna, a cellular network interface card, or other wired or wireless network adapters or interfaces.

The share management system 10 and the client device 20 may each include components connected by a data transmission path such as a bus. Further, the share management system 10 may include an input device or a display.

Figure 2:
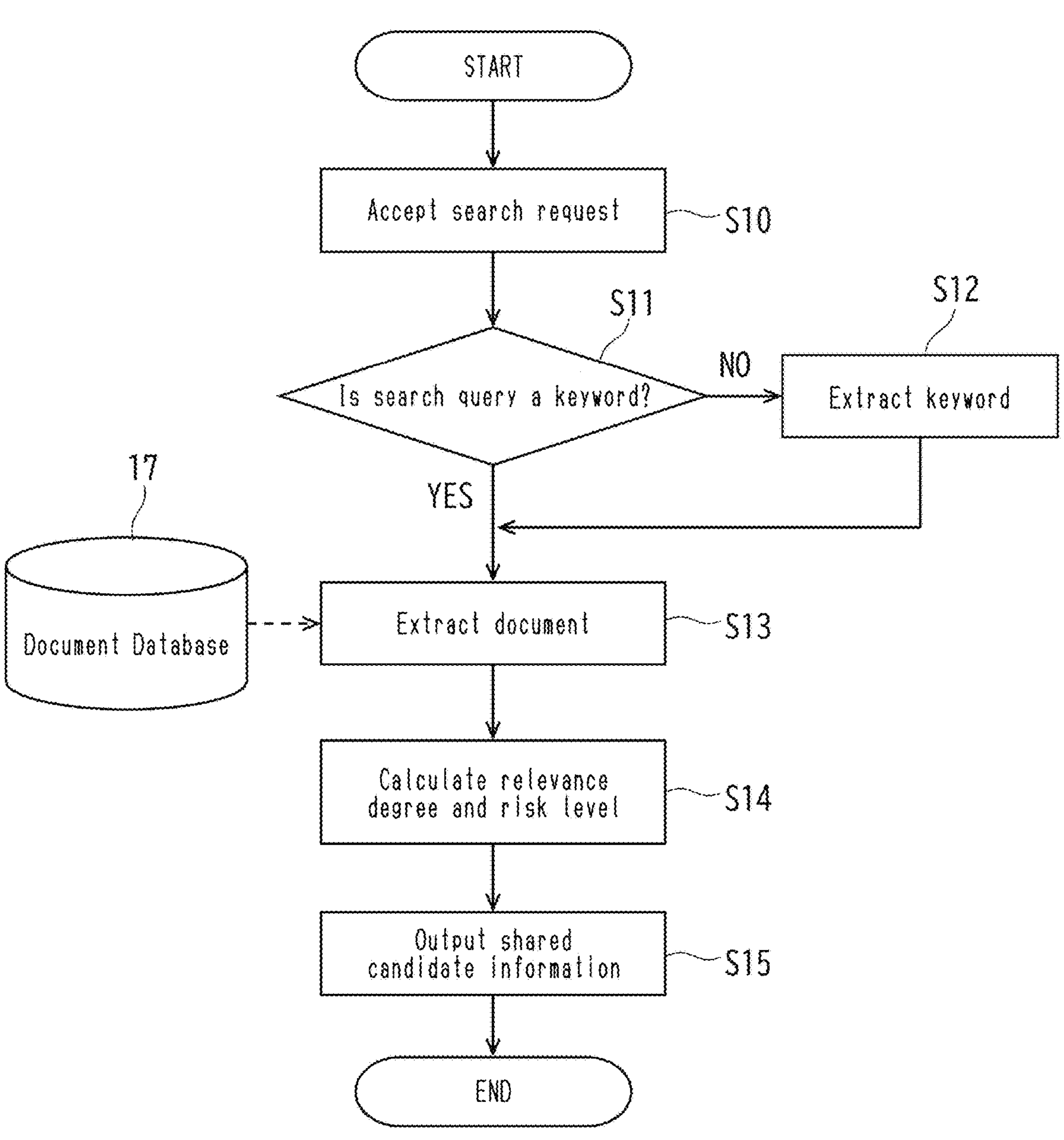
FIG. 2 is a flowchart illustrating the process flow of a functionality of the document share system for determining shared candidates according to one or more embodiments.

Examples of share candidate determination functionality are provided. With reference to FIG. 2, the process executed with the share candidate determination functionality will now be described.

As shown in FIG. 2, the processor 11 of the share management system 10 accepts a request from the client device 20 to search for a document (step S10).

More specifically, the client who wishes a document to be shared operates the input device 25 to input a search query to the client device 20. Consequently, the search query and the search request are sent from the client device 20 to the share management system 10. The search query may be a keyword. Additionally, the search request may be a phrase or sentence expressed in natural language. The user inputs to the client device 20 a search query related to the content of the document wished/desired to be shared.

When receiving the search request, the processor 11 determines whether the search query is a keyword (step S11). When the search query is not a keyword, the processor 11 performs natural language processing to extract a keyword from the search query (step S12). A known technique may be used to perform the natural language processing.

The processor 11 uses the keyword that is the search query or the keyword that is extracted from the search query to extract at least one document related to the keyword from the documents in a document database 17 (step S13). The extracted document is a processing document subject or the target document.

The document database 17 stores the data of the documents possessed by the organization. Attribute data is added to each document. The attribute data includes administrator data indicating an administrator of the document. The administrator may be a member of the same organization as the user who wishes a document to be shared. The administrator may be, for example, the author or owner of a document. The document database 17 may be included in the database 16 or in an external device.

A known technique may be used to perform the searching process. The search query is not limited to text. The search query may include an image instead of or in addition to text.

For each part of the processing document subject or target document, the processor 11 calculates a degree of relevance with the search query and a risk level (step S14). The relevance degree indicates how relevant the content of the part is to the search query. When the search query is text, the relevance degree indicates the relevance between the content of the part and the keyword. The relevance degree is calculated with a numerical value such as a coefficient. A known technique may be used to calculate the relevance degree. In one example, the processor 11 increases the relevance degree as the frequency of a keyword appears in the sentences included in the part of the target document.

The risk level indicates a confidentiality degree of the contents of the part. The processor 11 analyzes the information contained in the part to calculate the risk level. For example, the processor 11 increases the risk level as the specificity of the information contained in the part increases such as when the information is private information, price information, confidential information, etc. A known technique may be used to calculate the risk level. The risk level may be calculated using, for example, an index indicating the anonymity of data, such as k-anonymity, I-diversity, k-map, or δ-presence. Additionally, the processor 11 may calculate the risk level by determining whether the part includes keywords or information that are set in advance.

Based on the relevance degree, the processor 11 selects parts of the target document that are share candidates as shared part candidates and outputs share candidate information (step S15). The processor 11, for example, sets one or more parts having a relevance degree greater than a predetermined value as the shared part candidates. The share candidate information includes the risk level of the shared part candidates. The processor 11 may add data that includes the share candidate information to the shared part candidates. The shared part candidates may be determined prior to the calculation of the risk level so that the risk level is calculated for only the shared part candidates.

Figures 3, 4:
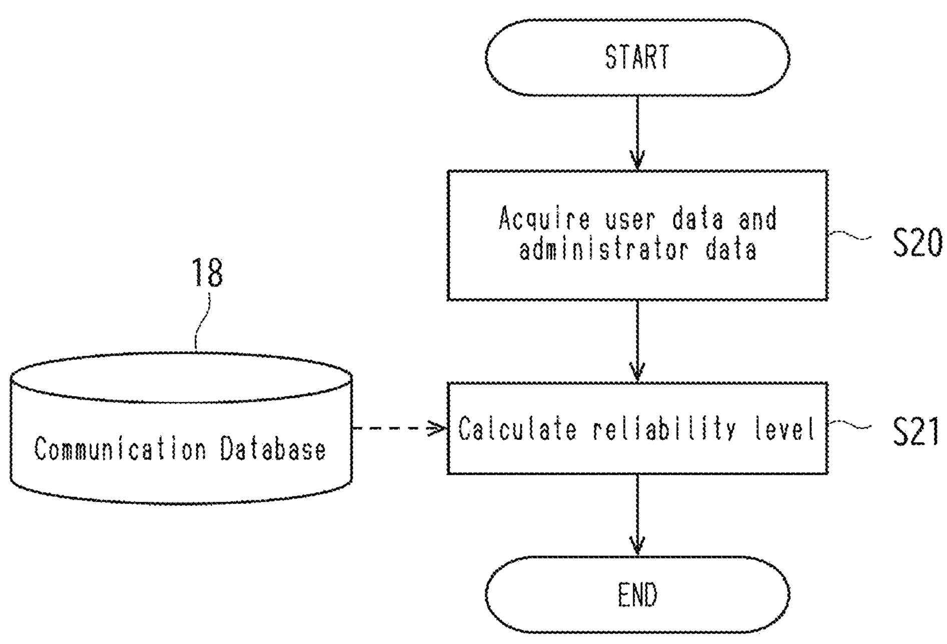
FIG. 3 is a flowchart illustrating the process flow of a functionality of the document share system for calculating reliability according to one or more embodiments.
FIG. 4 is a flowchart illustrating the process flow of a functionality of the document share system for generating a search result according to one or more embodiments.

An example of reliability calculation functionality is provided. With reference to FIG. 3, the process executed with the reliability calculation functionality will now be described.

As shown in FIG. 3, after the shared part candidates are determined, the processor 11 acquires user data, which indicates the user who requested for the search to be performed, and administrator data, which indicates the administrator of the targeted document including the shared part candidates (step S20).

The user data is data that allows for identification of the user within the organization and may be, for example, an identification number or email address of the user. The processor 11 acquires the user data when accessed by the client device 20. The administrator data is data that allows for identification of the administrator within the organization and may be, for example, an identification number or email address of the administrator. The processor 11 may acquire the administrator data from the attribute data of the document.

Based on the user data and the administrator data, the processor 11 calculates a reliability level by referring to a communication database 18 (step S21). The communication database 18 contains log data of a communication tool used within the organization. The communication tool includes, for example, email, chat, and other collaboration tools. The communication database 18 may be included in the database 16 or an external device.

The reliability level indicates how reliable the user is from the perspective of the administrator. The processor 11 acquires the identification of the user, which is indicated by the user data, and the history of communication between the administrator and the user from the log data of the communication database 18 to analyze the log data and evaluate the density of communication in order to calculate the reliability level.

The processor 11 may, for example, acquire the frequency of communication and the time of communication between the user and the administrator from the history of communication. Further, the processor 11 may use at least one of the frequency of communication and/or the time of communication to calculate the reliability level.

The processor 11 also performs natural language processing to infer the mood of at least one of the user and/or the administrator during communication from text data, which is the history of communication. A machine learning model may be used to infer the mood. Further, the processor 11 may use mood data, which is data in numerical values or the like indicating the inferred mood, to calculate the reliability level. The reliability level may be, for example, a function of three variables, which are the frequency of communication, the time of communication, and the mood data.

The reliability level is calculated on a scale comparable to the risk level. For example, the reliability level and the risk level may each be normalized and expressed within a range from 0 to 1.0, inclusive.

An example of search result generation functionality is provided. With reference to FIG. 4, the process executed with the search result generation functionality will now be described.

As shown in FIG. 4, the processor 11 determines the information on each of the shared part candidates that is to be displayed as the search result based on the risk level and the reliability level that are included in the share candidate information (step S30).

More specifically, the processor 11 displays more information related to the shared part candidates in the search result when the reliability level is greater than the risk level than when the reliability level is less than the risk level. The information related to the shared part candidates may contain attribute information of the shared part candidates and attribute information of the target document including the shared part candidates.

More specifically, when the reliability level is greater than the risk level, the processor 11 includes the attribute information of the shared part candidates and attribute information of the target document including the shared part candidates in the search result. When the reliability level is less than the risk level, the processor 11 includes attribute information of the target document including the shared part candidates in the search result but does not include the attribute information of the shared part candidates in the search result.

The attribute information of a shared part candidate is, for example, an outline or the like of the shared part candidate. The outline of the shared part candidate is, for example, an excerpt of a portion including the keyword in the shared part candidate and may be generated by the processor 11. The attribute information of a document is, for example, the title, administrator, and the like of the document. The attribute information of a document may be information contained in attribute data added to the document.

The processor 11 may include more information related to the shared part candidates in the display of the search result as the reliability level becomes greater than the risk level.

When, for example, the reliability level is a predetermined minimum value, such as when the reliability level is 0, regardless of the risk level, the processor 11 does not have to include information related to the shared part candidates in the display of the search result. That is, when the reliability level is extremely low (as predefined), information related to the shared part candidates is not output as the search result. When the reliability level is less than or equal to a predetermined value, which includes a case when the reliability level is the minimum value, the processor 11 does not have to include information related to the shared part candidates in the display of the search result.

Further, for example, when the risk level is a predetermined maximum value, such as when the risk level is 1.0, regardless of the reliability level, the processor 11 does not have to include information related to the shared part candidates in the display of the search result. That is, when the risk level is extremely high (as predefined), information related to the shared part candidates is not output as the search result. When the risk level is greater than or equal to a predetermined value, which includes a case when the risk level is the maximum value, the processor 11 does not have to include information related to the shared part candidates in the display of the search result.

The processor 11 generates data for the display of the search result in accordance with the determined display content. Then, the processor 11 transmits the data for the display of the search result from the communication unit 14 to the client device 20 (step S31).

Consequently, the processor 21 of the client device 20 uses the data received from the client device 20 to display the search result on the display 26.

Figure 5:
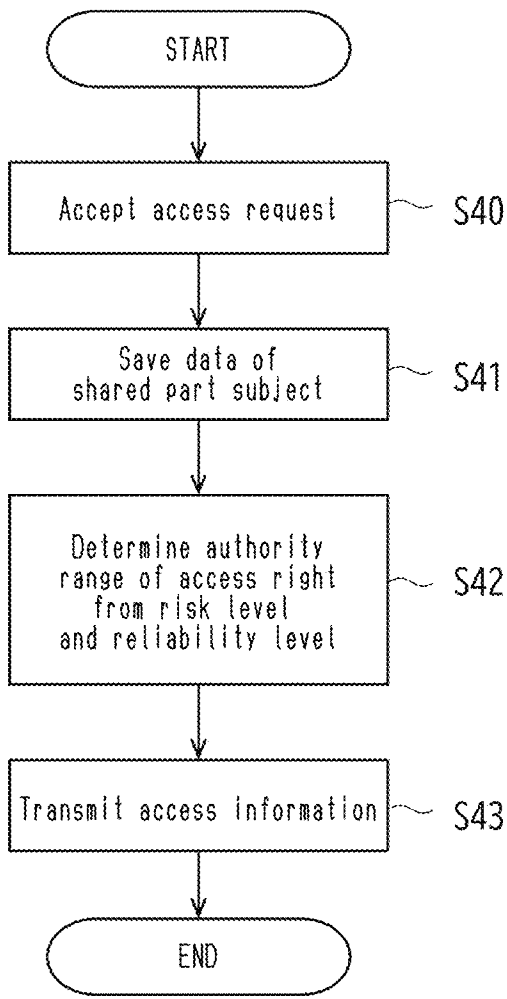
FIG. 5 is a flowchart illustrating the process flow of a functionality of the document share system for administering access rights according to one or more embodiments.

As example of access right administering functionality is provided. With reference to FIG. 5, the process executed with the access right administering functionality will now be described.

As shown in FIG. 5, the processor 11 accepts a request from the client device 20 to access the shared part candidates (step S40).

More specifically, the user operates the input device 25 to select one of the shared part candidates from the search result displayed on the client device 20. In response, the client device 20 sends a request for accessing the selected shared part candidate to the share management system 10.

The shared part candidate requested to be accessed is a shared part subject or target shared part.

The processor 11 extracts the data of the shared part subject (or target shared part) from the data of the (target) document that includes the shared part subject (or target shared part) and saves the extracted data in a non-volatile memory area of the memory 12 or a non-volatile area of the storage 13 (step S41). In other words, the shared part subject (or target shared part) is split/separated/removed from the document and saved. The shared part subject (or target shared part) may be saved in a temporary manner, for example, the shared part subject (or target shared part) may be deleted from the non-volatile memory area after a predetermined time elapses.

The processor 11 determines a range of authority for an access right granted to the user based on the risk level and the reliability level of the shared part subject (or target shared part) (step S42). For example, the processor 11 may determine the range of authority for the access right granted to the user by setting one of different types of access rights as the access right. The types of access rights include an access right permitting only reading of the shared part subject (or target shared part) and an access right permitting downloading of the shared part subject (or target shared part).

The processor 11 gives more authority to the access right when the reliability level is greater than the risk level than when the reliability level is less than the risk level.

For example, when the reliability level is greater than the risk level, the processor 11 grants the user an access right permitting downloading of the shared part subject (or target shared part). In this case, the granted access right allows for browsing and saving of the shared part subject (or target shared part). More specifically, the processor 11 creates a shared link to the memory area where the shared part subject (or target shared part) is saved and sends the shared link to the client device 20 for access.

The sharing link is set to permit downloading of the shared part subject (or target shared part).

When the reliability level is less than the risk level, the processor 11 grants the user an access right permitting only reading of the shared part subject (or target shared part). In this case, the granted access right allows for only browsing of the shared part subject (or target shared part). More specifically, the processor 11 creates a shared link set to permit only reading of the shared part subject (or target shared part) and send the shared link to the client device 20.

The processor 11 may give more authority to the access right granted to the user as the reliability level becomes greater than the risk level.

When, for example, the reliability level is the minimum value, such as when the reliability level is 0, regardless of the risk level, the processor 11 does not have to grant the user a right to access the shared part subject (or target shared part). In this case, no shared link is created. When the reliability level is less than or equal to a predetermined value, which includes a case when the reliability level is the minimum value, the processor 11 does not have to grant the user a right to access the shared part subject (or target shared part).

Further, for example, when the risk level is the maximum value, such as when the risk level is 1.0, regardless of the reliability level, the processor 11 does not have to grant the user a right to access the shared part subject (or target shared part). In this case, no shared link is created. When the risk level is greater than or equal to a predetermined value, which includes a case when the risk level is the maximum value, the processor 11 does not have to grant the user a right to access the shared part subject (or target shared part).

The processor 11 transmits information for accessing the shared part subject (or target shared part) from the communication unit 14 to the client device 20 (step S43). More specifically, the shared link is transmitted to the client device 20. The client device 20 uses the shared link to access the shared part subject (or target shared part) so that the shared part subject (or target shared part) is shared by the user.

As long as access is permitted in accordance with the determined access right, the client device 20 may be provided with access information in a manner differing from the shared link. Steps S40 and S41 may be performed on each of the shared part candidates, and the client device 20 may be provided with access information of each shared part candidate together with the search result. In this case, the shared part candidates are all shared part subjects (or target shared parts).

Technical advantages and effects of one or more embodiments may be provided. One or more embodiments in accordance with the present disclosure do not necessarily have to include all the advantages described below. Some of the embodiments may not include the advantages described below.

(1) The relevance degree of documents parts and the search query is acquired to determine the shared part candidates. The shared part subject (or target shared part) split from a document is saved, and the access right to the shared part subject (or target shared part) is administered to the user making the search request. Thus, searches and access administration are performed in units/divisions of document parts so that the information contained in the document can be shared securely and efficiently. In this manner, the user can access the desired information more readily than when access administration is not performed in units/divisions of documents. Further, the user cannot access information that is not relevant. This ensures security.

(2) The risk level of the shared part candidates is calculated. This quantifies the confidentiality degree of the shared part candidates and allows the confidentiality degree of the shared part candidates to be reflected in the management of shared documents.

(3) The reliability level is calculated for the user who wishes to share a document including shared part candidates with the administrator of the document. This quantifies the degree of how reliable the user is from the perspective of the administrator. Thus, the reliability degree of the user from the perspective of the administrator is reflected in document sharing process.

(4) The frequency of communication is used to calculate the reliability level in an accurate manner.

(5) The time of communication is used to calculate the reliability level in an accurate manner.

(6) The mood data is used to increase the calculation accuracy of the reliability level.

(7) The information related to the shared part candidates that is to be included in the display of the search result is determined based on the risk level and the reliability level. In this manner, the information included in the search result is determined by taking into consideration the relationship between the user and the administrator in addition to contents of the shared part candidates. Thus, the information of the search result is disclosed securely.

(8) More information related to the shared part candidates is included in the display of the search result when the reliability level is greater than the risk level than when the reliability level is less than the risk level. In this manner, the confidentiality degree of the shared part candidates and the degree of how reliable the user is from the perspective of the administrator are evaluated in a quantified manner so that more information is disclosed when the reliability degree is greater than the confidentiality degree. This allows information to be disclosed in a further secure manner.

(9) Information related to the shared part candidates is not contained in the display of the search result when at least one of a condition in which reliability level is the minimum value and/or a condition in which the risk level is the maximum value is satisfied. In this manner, information related to the shared part candidates is not disclosed when the reliability of the user from the perspective of the administrator is extremely low (as predefined) or when the confidentiality degree of the shared part candidates is extremely high (as predefined). This prevents unsecure information from being disclosed.

(10) The display of the search result includes, as the information related to the shared part candidates, at least one of the outline of the shared part candidates, the title of the document including the shared part candidates, and/or the administrator of the document including the shared part candidates. In this manner, the search result discloses useful information.

(11) The range of authority for the access right granted to the user is determined based on the risk level and the reliability level of the shared part subject (or target shared part). In this manner, the access right to the shared part subject (or target shared part) granted to the user is administered by taking into consideration the relationship between the user and the administrator in addition to the contents of the shared part subject (or target shared part). This allows the information in the search result to be disclosed in a secure manner.

(12) More authority is given to the access right to the shared part subject (or target shared part) granted to the user when the reliability level is greater than the risk level than when the reliability level is less than the risk level. In this manner, the confidentiality degree of the shared part candidates and the degree of how reliable the user is from the perspective of the administrator are evaluated in a quantified manner so that higher access freedom is allowed when the reliability degree is greater than the confidentiality degree. This allows information to be disclosed in a secure manner.

(13) The user is rejected access to the shared part subject (or target shared part) when at least one of a condition in which the reliability level is the minimum value and/or a condition in which the risk level is the maximum value is satisfied. In this manner, when the reliability of the user from the perspective of the administrator is extremely low (as predefined) or when the confidentiality degree of the shared part subject (or target shared part) is extremely high (as predefined), the user cannot access the shared part candidate. This prevents disclosure of unsecure information.

(14) The access right granted to the user is an access right permitting only reading of the shared part subject (or target shared part) or an access right permitting downloading of the shared part subject (or target shared part). This allows different rights to be set.

(15) A shared link to the shared part subject (or target shared part) that is in accordance with the range of authority determined for the access right is output to the client device. This ensures that the access right is granted to the user in accordance with the determination.

(16) The shared part subject (or target shared part) is the shared part candidate that is designated by the user. Thus, the processing load on the processor for saving the split data and setting the access right is less than when the shared part candidates are all shared part subjects (or target shared parts).

Further examples are discussed in accordance with one or more embodiments.

The above embodiment may be modified as described below. The above embodiment and the modified examples described below may be combined as understood by one of ordinary skill in the art.

In the share candidate determination functionality, the unit/division of the parts of which the degree of relevance to the search request is acquired may differ from the unit/division of the shared part candidates. For example, the processor 11 may extract parts of which the relevance degree is greater than or equal to a predetermined value from a document and collectively set these parts as a single shared part candidate.

When the access right is administered for each shared part subject (or target shared part), the risk level and the reliability level do not have to be used when generating the search result or setting the access right. The generation of the search result and the setting of the access right may be performed by using (only) one of the risk level and the reliability level or by using an index differing from the risk level and the reliability level. The type of information contained in the display of the search result may be the same for all the shared part candidates. When the risk level or the reliability level is not used, the share management system 10 does not have to include the functionality for calculating the risk level or the functionality for calculating the reliability level.

The diagrams and flowcharts of in the present disclosure illustrate the device, system, method, program architecture, functionality, and operation of embodiments in accordance with the present disclosure. The elements included in the diagrams and the steps included in the flowcharts may correspond to a part of a program including one or more instructions for implementing a logical functional unit. In other embodiments, some of the illustrated components may be omitted, other components may be included, and the layout of the components may be changed. Also, in other embodiments, some of the illustrated steps may be omitted, other steps may be included, the steps may be in a different order, and some of the steps may be performed simultaneously. Further, the series of actions illustrated in the flowcharts may be divided into multiple parts when executed. Multiple flowcharts may be executed continuously or in association with one another. Functionalities implemented by such elements and steps may be implemented by hardware, software, or a combination of hardware and software.

The present disclosure may be implemented as a method, a computer system, a computer program product, or a combination of a method, a computer system, and a computer program product. The computer program product may include a computer-readable storage medium including program instructions for causing a processor to execute the aspects of the present disclosure. Functionalities and operations specified by the diagrams and flowcharts of the present disclosure or by a combination of the diagrams and flowcharts may be implemented by program instructions. The program instructions may also be loaded to and executed by a computer or other programmable data processing devices so that the computer or other programmable data processing devices implement the functionalities and operations described above.

Program instructions of the present disclosure may be downloaded from a computer-readable storage medium to a computer device that performs processing or may be downloaded to a computer device or an external storage device via a network. A communication unit of the computer device receives program instructions from the network and transfers the program instructions for storage to a computer-readable storage medium within the computer device.

Program instructions of the present disclosure may be assembler instructions, instruction set architecture (ISA) instructions, machine instructions, machine-dependent instructions, microcode, firmware instructions, or state-setting data. Program instructions may also be source code or object code written in any combination of one or more programming languages, including an object-oriented programming language, such as C++, and conventional procedural programming languages, such as the C programming language. The program instructions may be executed in part or in whole on a remote computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A computer-implemented method comprising:

receiving, by a processor, a search request of a search query input from a client device by a user;

acquiring a relevance degree for parts of a document stored in a document database based on the search query;

determining, based on the relevance degree, the parts of the document that are shared par candidates, in which at least one of the shared part candidates is a target shared part;

extracting the target shared part from the document to be granted to the user;

calculating a reliability level indicating how reliable the user is from a perspective of an administrator of the document including the shared part candidates by referring to a log data of communication between the user and the administrator;

wherein the administrator of the document is identified by administrator data; and granting an access right to the target shared part to the user in accordance with the relevance degree and the reliability level.

2. The computer-implemented method according to claim 1, further comprising:

calculating a risk level indicating a confidentiality degree of the shared part candidates based on analysis of information contained in the shared part candidates.

3. The computer-implemented method according to claim 1, wherein the log data of communication is between the user and the administrator and is captured with a communication tool; and wherein the reliability level is based on a density of communication between the user and the administrator.

4. The computer-implemented method according to claim 1, wherein the calculating the reliability level includes acquiring a frequency of communication between the user and the administrator based on the log data of communication and using the frequency of communication to calculate the reliability level.

5. The computer-implemented method according to claim 1, wherein the calculating the reliability level includes acquiring a time of communication between the user and the administrator based on the log data of communication and using the time of communication to calculate the reliability level.

6. The computer-implemented method according to claim 1, wherein the calculating the reliability level includes inferring a mood of at least one of the user and the administrator during a communication between the user and the administrator based on the log data of communication and using data indicating the mood to calculate the reliability level.

7. The computer-implemented method according to claim 1, further comprising:

calculating a risk level indicating a confidentiality degree of the shared part candidates based on an analysis of information contained in the shared part candidates;

determining information related to the shared part candidates that is to be included in a display of a search result in response to the search request based on the risk level and the reliability level; and displaying the search result.

8. The computer-implemented method according to claim 7, wherein the displaying the search result includes generating data for displaying the search result by providing more information related to the shared part candidates in the display of the search result when the reliability level is greater than the risk level.

9. The computer-implemented method according to claim 7, wherein the displaying the search result includes generating data for displaying the search result while excluding information related to the shared part candidates in the display of the search result when the reliability level is a predefined minimum value.

10. The computer-implemented method according to claim 7, wherein the displaying the search result includes generating data for displaying the search result while excluding information related to the shared part candidates in the display of the search result when the risk level is a predefined maximum value.

11. The computer-implemented method according to claim 1, further comprising:

calculating a risk level indicating a confidentiality degree of the shared part candidates based on an analysis of information contained in the shared part candidates; and wherein the log data of communication is between the user and the administrator and is captured with a communication tool;

wherein the granting the access right to the target shared part to the user includes determining a range of authority for the access right granted to the user based on the risk level and the reliability level.

12. The computer-implemented method according to claim 11, wherein the determining the range of authority for the access right granted to the user includes increasing an authority when the reliability level is greater than the risk level.

13. The computer-implemented method according to claim 11, further comprising:

outputting to the client device a shared link to the target shared part that is in accordance with the range of authority determined for the access right.

14. A computer system comprising:

a memory having computer readable instructions; and one or more processors for executing the computer readable instructions, the computer readable instructions when executed cause the one or more processors to perform operations comprising:

receiving a search request of a search query input from a client device by a user;

acquiring a relevance degree for parts of a document stored in a document database based on the search query;

determining, based on the relevance degree, the parts of the document that are shared part candidates, in which at least one of the shared part candidates is a target shared part;

extracting the target shared part from the document to be granted to the user;

calculating a reliability level indicating how reliable the user is from a perspective of an administrator of the document including the shared part candidates by referring to a log data of communication between the user and the administrator;

wherein the administrator of the document is identified by administrator data; and granting, by the processor, an access right to the target shared part to the user in accordance with the relevance degree and the reliability level.

15. The computer system according to claim 14, wherein the one or more processors perform operations further comprising:

calculating a risk level indicating a confidentiality degree of the shared part candidates based on analysis of information contained in the shared part candidates.

16. The computer system according to claim 14, wherein the log data of communication is between the user and the administrator and is captured with a communication tool.

17. The computer system according to claim 14, wherein the calculating the reliability level includes acquiring a frequency of communication between the user and the administrator based on the log data of communication and using the frequency of communication to calculate the reliability level.

18. The computer system according to claim 14, wherein the calculating the reliability level includes acquiring a time of communication between the user and the administrator based on the log data of communication and using the time of communication to calculate the reliability level.

19. The computer system according to claim 14, wherein the calculating the reliability level includes inferring a mood of at least one of the user and the administrator during a communication between the user and the administrator based on the log data of communication and using data indicating the mood to calculate the reliability level.

20. A computer program product comprising a computer readable storage medium having program instructions embodied therewith, the program instructions executable by one or more processors to cause the one or more processors to perform operations comprising:

receiving a search request of a search query input from a client device by a user;

acquiring a relevance degree for parts of a document stored in a document database based on the search query;

determining, based on the relevance degree, the parts of the document that are shared par candidates, in which at least one of the shared part candidates is a target shared part;

extracting the target shared part from the document to be granted to the user;

calculating a reliability level indicating how reliable the user is from a perspective of an administrator of the document including the shared part candidates by referring to a log data of communication between the user and the administrator;

wherein the administrator of the document is identified by administrator data; and granting an access right to the target shared part to the user in accordance with the relevance degree and the reliability level.

* * * * *